United States Patent
Rached

(10) Patent No.: US 10,858,562 B2
(45) Date of Patent: *Dec. 8, 2020

(54) BINARY REFRIGERATING FLUID

(71) Applicant: ARKEMA FRANCE, Colombes (FR)

(72) Inventor: Wissam Rached, Chaponost (FR)

(73) Assignee: ARKEMA FRANCE, Colombes (FR)

(*) Notice: Subject to any disclaimer, the term of this patent is extended or adjusted under 35 U.S.C. 154(b) by 79 days.

This patent is subject to a terminal disclaimer.

(21) Appl. No.: 16/143,518

(22) Filed: Sep. 27, 2018

(65) Prior Publication Data

US 2019/0023957 A1 Jan. 24, 2019

Related U.S. Application Data

(63) Continuation of application No. 15/856,703, filed on Dec. 28, 2017, now Pat. No. 10,125,296, which is a continuation of application No. 14/830,130, filed on Aug. 19, 2015, now Pat. No. 9,884,984, which is a continuation of application No. 13/391,400, filed as application No. PCT/FR2010/051724 on Aug. 17, 2010, now Pat. No. 9,133,379.

(30) Foreign Application Priority Data

Sep. 11, 2009 (FR) ..................... 09 56240

(51) Int. Cl.
C09K 5/04 (2006.01)
F25B 9/00 (2006.01)

(52) U.S. Cl.
CPC ........ C09K 5/045 (2013.01); *C09K 2205/122* (2013.01); *C09K 2205/126* (2013.01); *C09K 2205/22* (2013.01); *F25B 9/006* (2013.01)

(58) Field of Classification Search
CPC ............ C09K 5/045; C09K 2205/122; C09K 2205/126; C09K 2205/22; F25B 9/006; F25B 1/00
USPC ........................................ 252/67, 68; 62/115
See application file for complete search history.

(56) References Cited

U.S. PATENT DOCUMENTS

| | | |
|---|---|---|
| 6,176,102 B1 | 1/2001 | Novak et al. |
| 6,503,417 B1 | 1/2003 | Bivens |
| 8,070,977 B2 | 12/2011 | Rached |
| 8,075,798 B2 | 12/2011 | Rached |
| 8,246,850 B2 | 8/2012 | Rached |
| 8,252,198 B2 | 8/2012 | Rached |
| 8,557,135 B2 | 10/2013 | Rached |
| 8,808,569 B2 | 8/2014 | Rached |
| 8,858,824 B2 | 10/2014 | Boussand |
| 8,858,825 B2 | 10/2014 | Guerin et al. |
| 8,992,793 B2 | 3/2015 | Sato |
| 9,011,711 B2 | 4/2015 | Rached |
| 9,028,706 B2 | 5/2015 | Rached et al. |
| 9,039,922 B2 * | 5/2015 | Rached .................. C09K 5/045 252/67 |
| 9,046,348 B2 | 6/2015 | Abbas |
| 9,057,010 B2 | 6/2015 | Rached |
| 9,127,191 B2 | 9/2015 | Rached |
| 9,133,379 B2 | 9/2015 | Rached |
| 9,175,203 B2 | 11/2015 | Rached |
| 9,267,064 B2 | 2/2016 | Rached |
| 9,315,708 B2 | 4/2016 | Guerin et al. |
| 9,359,540 B2 | 6/2016 | Rached |
| 9,399,726 B2 | 7/2016 | Rached |
| 9,505,968 B2 | 11/2016 | Rached |
| 9,512,343 B2 | 12/2016 | Rached et al. |
| 9,599,381 B2 | 3/2017 | Rached |
| 9,650,551 B2 | 5/2017 | Collier et al. |
| 9,650,553 B2 | 5/2017 | Deur-Bert et al. |
| 9,663,697 B2 | 5/2017 | Rached |
| 9,676,984 B2 | 6/2017 | Guerin et al. |
| 9,683,154 B2 | 6/2017 | Rached |
| 9,683,155 B2 | 6/2017 | Deur-Bert et al. |
| 9,683,157 B2 | 6/2017 | Rached |
| 9,758,709 B2 | 9/2017 | Shibanuma et al. |
| 9,845,419 B2 | 12/2017 | Yana Motta et al. |
| 9,884,984 B2 | 2/2018 | Rached |
| 9,908,828 B2 | 3/2018 | Rached et al. |
| 9,969,918 B2 | 5/2018 | Deur-Bert et al. |
| 10,023,780 B2 | 7/2018 | Guerin et al. |
| 10,035,938 B2 | 7/2018 | Rached |

(Continued)

FOREIGN PATENT DOCUMENTS

EP 2 149 592 A2 2/2010
FR 2 182 956 A3 12/1973

(Continued)

OTHER PUBLICATIONS

U.S. Appl. No. 61/116,029, filed Nov. 19, 2008. (Year: 2008).*
Notice of Reasons for Refusal (Office Action) issued by the Japanese Patent Office in Japanese Patent Application No. 2018-215896, dated Nov. 15, 2019, and English-language translation (8 pages).
U.S. Appl. No. 13/146,721, Wissam Rached, filed Jul. 28, 2011 (Cited herein as US Patent Application Publication 2011/0284181 A1 of Nov. 24, 2011).

(Continued)

*Primary Examiner* — Douglas J McGinty

(74) *Attorney, Agent, or Firm* — Buchanan Ingersoll & Rooney P.C.

(57) ABSTRACT

Binary compositions of 2,3,3,3-tetrafluoropropene and difluoromethane, and especially to the uses thereof as a heat transfer fluid in compression systems with exchangers operating in counterflow mode or in split flow mode with counterflow tendency. Also, a method of heat transfer in which a binary composition of 2,3,3,3-tetrafluoropropene and difluoromethane is used as refrigerant in compression systems with exchangers in countercurrent mode or in crossed-current mode with countercurrent tendency.

15 Claims, No Drawings

(56) References Cited

U.S. PATENT DOCUMENTS

| | | |
|---|---|---|
| 10,119,055 B2 | 11/2018 | Boussand |
| 10,125,296 B2 | 11/2018 | Rached |
| 10,131,829 B2 | 11/2018 | Deur-Bert et al. |
| 10,208,236 B2* | 2/2019 | Minor .................. C08J 9/146 |
| 10,252,913 B2 | 4/2019 | Bonnet et al. |
| 10,316,231 B2 | 6/2019 | Rached |
| 10,358,592 B2 | 7/2019 | Rached |
| 10,377,935 B2 | 8/2019 | Guerin et al. |
| 10,399,918 B2 | 9/2019 | Rached |
| 10,450,488 B2 | 10/2019 | Boussand |
| 2006/0243944 A1 | 11/2006 | Minor et al. |
| 2007/0069175 A1 | 3/2007 | Thomas et al. |
| 2008/0184731 A1 | 8/2008 | Sienel et al. |
| 2008/0230738 A1 | 9/2008 | Minor et al. |
| 2008/0314073 A1 | 12/2008 | Minor |
| 2009/0120619 A1 | 5/2009 | Sievert |
| 2009/0267019 A1 | 10/2009 | Motta et al. |
| 2009/0314015 A1 | 12/2009 | Minor et al. |
| 2010/0044619 A1 | 2/2010 | Hulse et al. |
| 2010/0122545 A1* | 5/2010 | Minor .................. C08J 9/146 62/324.1 |
| 2010/0186432 A1 | 7/2010 | Perti et al. |
| 2010/0319377 A1 | 12/2010 | Moriwaki et al. |
| 2010/0326129 A1 | 12/2010 | Moriwaki et al. |
| 2011/0084228 A1 | 4/2011 | Rached |
| 2011/0089366 A1 | 4/2011 | Rached |
| 2011/0095224 A1 | 4/2011 | Rached |
| 2011/0186772 A1 | 8/2011 | Rached |
| 2011/0219791 A1 | 9/2011 | Rached |
| 2011/0219792 A1 | 9/2011 | Rached |
| 2011/0240254 A1 | 10/2011 | Rached |
| 2011/0284181 A1 | 11/2011 | Rached |
| 2012/0049104 A1 | 3/2012 | Rached |
| 2012/0056123 A1 | 3/2012 | Rached |
| 2012/0068105 A1 | 3/2012 | Rached et al. |
| 2012/0097885 A9 | 4/2012 | Hulse et al. |
| 2012/0144857 A1 | 6/2012 | Rached |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0205574 A1 | 8/2012 | Rached et al. |
| 2012/0267564 A1* | 10/2012 | Leck .................. C09K 5/045 252/68 |
| 2013/0055733 A1 | 3/2013 | Rached |
| 2013/0055739 A1 | 3/2013 | Rached |
| 2013/0061613 A1 | 3/2013 | Rached |
| 2013/0092869 A1 | 4/2013 | Boussand |
| 2013/0096218 A1 | 4/2013 | Rached |
| 2013/0105724 A1 | 5/2013 | Boussand |
| 2013/0186114 A1 | 7/2013 | Guerin et al. |
| 2014/0008565 A1 | 1/2014 | Rached et al. |
| 2014/0075969 A1 | 3/2014 | Guerin et al. |
| 2014/0166923 A1 | 6/2014 | Motta et al. |
| 2014/0318160 A1 | 10/2014 | Rached |
| 2014/0326017 A1 | 11/2014 | Rached |
| 2015/0027146 A1 | 1/2015 | Boussand |
| 2015/0152306 A1 | 6/2015 | Rached |
| 2015/0152307 A1 | 6/2015 | Rached |
| 2015/0184051 A1 | 7/2015 | Rached |
| 2015/0184052 A1 | 7/2015 | Rached |
| 2015/0322317 A1 | 11/2015 | Collier et al. |
| 2015/0322321 A1 | 11/2015 | Deur-Bert et al. |
| 2015/0344761 A1 | 12/2015 | Rached |
| 2015/0353799 A1 | 12/2015 | Deur-Bert et al. |
| 2015/0353802 A1 | 12/2015 | Rached |
| 2016/0009555 A1 | 1/2016 | Bonnet et al. |
| 2016/0024363 A1 | 1/2016 | Rached |
| 2016/0025394 A1 | 1/2016 | Rached |
| 2016/0115361 A1 | 4/2016 | Boussand |
| 2016/0122609 A1 | 5/2016 | Rached |
| 2016/0194541 A1 | 7/2016 | Guerin et al. |
| 2016/0244652 A1 | 8/2016 | Rached |
| 2016/0272561 A1 | 9/2016 | Rached et al. |
| 2016/0298014 A1 | 10/2016 | Rached |
| 2016/0355718 A1 | 12/2016 | Rached |
| 2016/0376484 A1 | 12/2016 | Guerin et al. |
| 2017/0037291 A1 | 2/2017 | Rached et al. |
| 2017/0080773 A1 | 3/2017 | Rached |
| 2017/0145276 A1 | 5/2017 | Rached |
| 2017/0210960 A1 | 7/2017 | Deur-Bert et al. |
| 2017/0210962 A1 | 7/2017 | Collier et al. |
| 2017/0218241 A1 | 8/2017 | Deur-Bert et al. |
| 2017/0218242 A1 | 8/2017 | Rached |
| 2018/0086173 A1 | 3/2018 | Rached |
| 2018/0134936 A1 | 5/2018 | Rached |
| 2018/0148395 A1 | 5/2018 | Rached et al. |
| 2018/0244970 A1 | 8/2018 | Rached |
| 2018/0282603 A1 | 10/2018 | Guerin |
| 2018/0327645 A1 | 11/2018 | Boussand |
| 2019/0023957 A1 | 1/2019 | Rached |
| 2019/0203094 A1 | 7/2019 | Rached |
| 2019/0249057 A1 | 8/2019 | Rached |
| 2019/0284500 A1 | 9/2019 | Rached |
| 2019/0337874 A1 | 11/2019 | Rached et al. |
| 2019/0359870 A1 | 11/2019 | Rached |
| 2019/0367789 A1 | 12/2019 | Rached |
| 2020/0165500 A1* | 5/2020 | Minor .................. C09K 5/045 |
| 2020/0216734 A1 | 7/2020 | Rached et al. |
| 2020/0216735 A1* | 7/2020 | Itano .................. C09K 5/04 |
| 2020/0263068 A1* | 8/2020 | Hulse .................. C09K 5/045 |

FOREIGN PATENT DOCUMENTS

| | | |
|---|---|---|
| FR | 2 256 381 A | 7/1975 |
| JP | H04-110388 | 4/1992 |
| JP | 2000-161805 | 6/2000 |
| JP | 2005-202637 A | 7/2005 |
| JP | 2008-134031 A | 6/2008 |
| JP | 2008-531836 A | 8/2008 |
| JP | 2009-532520 A | 9/2009 |
| JP | 2009-222362 A | 10/2009 |
| JP | 2009-228984 A | 10/2009 |
| JP | 2009-257601 A | 11/2009 |
| JP | 2009-257655 A | 11/2009 |
| JP | 2009-257743 A | 11/2009 |
| JP | 2010-002074 A | 1/2010 |
| RU | 2 189 544 C2 | 9/2002 |
| WO | WO 2004/037913 A2 | 5/2004 |
| WO | WO 2004/037913 A3 | 5/2004 |
| WO | WO 2005/105947 A2 | 11/2005 |
| WO | WO 2005/105947 A3 | 11/2005 |
| WO | WO 2006/094303 A2 | 9/2006 |
| WO | WO 2006/094303 A3 | 9/2006 |
| WO | WO 2006/101563 A2 | 9/2006 |
| WO | WO 2007/126414 A2 | 11/2007 |
| WO | WO 2007/126414 A3 | 11/2007 |
| WO | WO 2008/027555 A2 | 3/2008 |
| WO | WO 2008/027555 A3 | 3/2008 |
| WO | WO 2008/085314 A2 | 7/2008 |
| WO | WO 2008/140809 A2 | 11/2008 |
| WO | WO 2009/107364 A1 | 9/2009 |
| WO | WO 2009/110228 A1 | 9/2009 |
| WO | WO 2010/000993 A2 | 1/2010 |
| WO | WO 2010/000993 A3 | 1/2010 |
| WO | WO 2010/000994 A2 | 1/2010 |
| WO | WO 2010/000994 A3 | 1/2010 |
| WO | WO 2010/002016 A1 | 1/2010 |
| WO | WO 2010/002023 A1 | 1/2010 |
| WO | WO 2010/059677 A2 | 5/2010 |
| WO | WO 2010/059677 A3 | 5/2010 |

OTHER PUBLICATIONS

U.S. Appl. No. 14/371,118, Béatrice Boussand, filed Jul. 8, 2014 (Cited herein as US Patent Application Publication No. 2015/0027146 A1 of Jan. 29, 2015).

U.S. Appl. No. 14/615,780, Wissam Rached, filed Feb. 6, 2015 (Cited herein as US Patent Application Publication No. 2015/0152307 A1 of Jun. 4, 2015).

(56) References Cited

OTHER PUBLICATIONS

U.S. Appl. No. 14/772,950, Phillippe Bonnet, Bertrand Collier, Dominique Deur-Bert, filed Sep. 4, 2015 (Cited herein as US Patent Application Publication No. 2016/0009555 A1 of Jan. 14, 2016).
U.S. Appl. No. 15/297,569, Wissam Rached and Béatrice Boussand, filed Oct. 19, 2016 (Cited herein as US Patent Application Publication No. 2017/0037291 A1 of Feb. 9, 2017).
U.S. Appl. No. 15/368,347, Wissam Rached, filed Dec. 2, 2016 (Cited herein as US Patent Application Publication No. 2017/0080773 A1 of Mar. 23, 2017).
U.S. Appl. No. 15/481,815, Bertrand Collier, Dominique Deur-Bert and Laurent Wendlinger, filed Apr. 7, 2017 (Cited herein as US Patent Application Publication No. 2017/0210962 A1 of Jul. 27, 2017).
U.S. Appl. No. 15/491,717, Wissam Rached, filed Apr. 19, 2017 (Cited herein as US Patent Application Publication No. 2017/0218242 A1 of Aug. 3, 2017).
U.S. Appl. No. 15/809,164, Wissam Rached, filed Nov. 10, 2017 (Cited herein as US Patent Application Publication No. 2018/0086173 A1 of Mar. 29, 2018).
U.S. Appl. No. 15/820,996, Wissam Rached, filed Nov. 22, 2017, (Cited herein as US Patent Application Publication No. 2018/0244970 A1 of Aug. 30, 2018).
U.S. Appl. No. 15/878,794, Wissam Rached, Sophie Guerin and Pascale Kindler, filed Jan. 24, 2018 (Cited herein as US Patent Application Publication No. 2018/0148395 A1 of May 31, 2018).
U.S. Appl. No. 15/997,077, Sophie Guerin and Wissam Rached, filed Jun. 4, 2018 (Cited herein as US Patent Application Publication No. 2018/0282603 A1 of Oct. 4, 2018).
U.S. Appl. No. 16/034,539, Béatrice Boussand, filed Jul. 13, 2018 (Cited herein as US Patent Application Publication No. 2018/0327645 A1 of Nov. 15, 2018).
U.S. Appl. No. 16/142,492, Wissam Rached, filed Sep. 26, 2018.
U.S. Appl. No. 16/142,492, Rached.
International Search Report issued in PCT/FR2010/051724, dated Jan. 21, 2011, EPO, Rijswijk, NL, 6 pages (English/French language versions).
Third Party Observation in corresponding EP 2475734, submitted Mar. 13, 2016 with European Patent Office, 76 pages.
Third Party Observation in corresponding Application No. EP 10 762 989.1, submitted Feb. 26, 2016 with European Patent Office, 40 pages.
Notice of Cancellation dated Jul. 27, 2016, issued in JP Patent No. 5,801,810 (English-language translation only), 10 pages.
CAS Reg. No. 754-12-1, Nov. 16, 1984, 1 page.
CAS Reg. No. 75-10-5, Nov. 16, 1984, 1 page.
Bigot, G., et al., "Optimized Design of Heat Exchangers for "Reversible" Heat Pump Using R-407C," Paper 463, *Eighth International Refrigeration and Air Conditioning Conference at Purdue University*, West Lafayette, IN, USA Jul. 25-28, 2000, pp. 38-46, Purdue University, Purdue e-Pubs, htte://docs.lib.purdue.edu/iracc/463.
Liu, X., "Efficiency of Non-Azeotropic Refrigerant Cycle," *International Refrigeration and Air Conditioning Conference*, Paper 396, 1998, pp. 108-114, Purdue University, Purdue e-Pubs, http://docs.lib.purdue.edu/iracc/396.
Minor, Barbara Haviland, et al., Certified U.S. Appl. No. 61/116,029, filed Nov. 19, 2008, 60 pages, including cover page.
Minor, Barbara Haviland, et al., Certified U.S. Appl. No. 61/180,201, filed May 21, 2009, 63 pages, including cover page.
Third Party Observation Pursuant to Article 115 EPC Relating to EP 10 762 989.1 (EP 2475734), dated Aug. 23, 2018, European Patent Office, Munich, DE, 13 pages.
Excerpt from *Römpp Chemistry Encyclopedia*, Editors: Prof. Dr. Jürgen Falbe, Prof Dr. Manfred Regitz, "binary system", 1996, three pages including p. 432, Georg Thieme Verlag, Stuttgart, DE.
Excerpt from *Heat and Mass Transfer Second, revised Edition*, Editors: Hans Dieter Baehr, Karl Stephan, 2006, 21 pages, including pp. 40-57, Springer, Berlin-Heidelberg-New York.
Radermacher, R., et al., "Vapor Compression Heat Pumps with Refrigerant Mixtures," 2005, 4 pages, CRC Press, Taylor & Francis Group, Boca Raton, FL.
U.S. Appl. No. 16/142,492 entitled "Heat Transfer Fluid," filed Sep. 26, 2018.
U.S. Appl. No. 16/339,903, Wissam Rached, filed Apr. 5, 2019.
U.S. Appl. No. 16/339,956, Wissam Rached, filed Apr. 5, 2019.
U.S. Appl. No. 16/395,413, Wissam Rached, filed Apr. 26, 2019.
U.S. Appl. No. 16/477,263, Wissam Rached, filed Jul. 11, 2019.
U.S. Appl. No. 16/477,318, Wissam Rached, filed Jul. 11, 2019.
U.S. Appl. No. 16/514,241, Wissam Rached, Sophie Guerin and Pascale Kindler, filed Jul. 17, 2019.
U.S. Appl. No. 16/339,903, Rached.
U.S. Appl. No. 16/339,956, Rached.
U.S. Appl. No. 16/395,413, Rached.
U.S. Appl. No. 16/477,263, Rached.
U.S. Appl. No. 16/477,318, Rached.
U.S. Appl. No. 16/514,241, Rached et al.
Rached, Wissam, U.S. Appl. No. 16/339,903 entitled "Tetrafluoropropene-Based Azeotropic Compositions," filed Apr. 5, 2019.
Rached, Wissam, U.S. Appl. No. 16/339,956 entitled "Use of Tetrafluoropropene Based Compositions", filed Apr. 5, 2019.
Rached, Wissam, U.S. Appl. No. 16/395,413 entitled "Low-Temperature and Average-Temperature Refrigeration," filed Apr. 26, 2019.
Rached, Wissam, U.S. Appl. No. 16/477,263 entitled "Composition Comprising 2,3,3,3-Tetrafluoropropene," filed Jul. 11, 2019.
Rached, Wissam, U.S. Appl. No. 16/477,318 entitled "Composition Comprising 2,3,3,3-Tetrafluoropropene," filed Jul. 11, 2019.
Rached, Wissam, et al., U.S. Appl. No. 16/514,241 entitled "Stabilization of 1-Chloro-3,3,3-Trifluoropropene," filed Jul. 17, 2019.
U.S. Appl. No. 16/962,143, Wissam Rached, filed Jul. 14, 2020.
U.S. Appl. No. 16/965,533, Wissam Rached, filed Jul. 28, 2020.
U.S. Appl. No. 16/965,638, Dominique Deur-Bert, Laurent Wendlinger, Béatrice Berger, filed Jul. 29, 2020.
U.S. Appl. No. 16/962,143, Rached.
U.S. Appl. No. 16/965,533, Rached.
U.S. Appl. No. 16/965,638, Deur-Bert et al.
Rached, Wissam, U.S. Appl. No. 16/962,143 entitled "Heat Transfer Compositions as Replacement for R-134a," filed Jul. 14, 2020.
Rached, Wissam, U.S. Appl. No. 16/965,533 entitled "Method for Cooling and/or Heating a Body or a Fluid in a Motor Vehicle," filed Jul. 28, 2020.
Deur-Bert, Dominique, et al., U.S. Appl. No. 16/965,638 entitled "Ternary Azeotropic or Quasi-Azeotropic Composition Comprising HF, 2,3,3,3-Tetrafluoropropene and 1,1,1,2,2-Pentafluoropropane," filed Jul. 29, 2020.

\* cited by examiner

BINARY REFRIGERATING FLUID

CROSS REFERENCE TO RELATED APPLICATIONS

The present application is a continuation of U.S. application Ser. No. 15/856,703, filed on Dec. 28, 2017, which is a continuation of U.S. application Ser. No. 14/830,130, filed on Aug. 19, 2015, which is a continuation of U.S. application Ser. No. 13/391,400, filed on Feb. 29, 2012, now U.S. Pat. No. 9,133,379, which is a U.S. National Stage of International Application No. PCT/FR2010/051724, filed on Aug. 17, 2020, which claims the benefit of French Application No. 09.56240, filed on Sep. 11, 2009. The entire contents of each of U.S. application Ser. No. 15/856,703, U.S. application Ser. No. 14/830,130, U.S. application Ser. No. 13/391,400, International Application No. PCT/FR2010/051724, and French Application No. 09.56240 are hereby incorporated herein by reference in their entirety.

TECHNICAL FIELD

The present invention relates to binary compositions of 2,3,3,3-tetrafluoropropene and difluoromethane and their uses as heat transfer fluids.

BACKGROUND

The problems posed by substances with ozone depletion potential (ODP) were discussed in Montreal, where the protocol was signed requiring a reduction of the production and use of chlorofluorocarbons (CFCs). Amendments have been made to this protocol, requiring abandonment of CFCs and extending the regulations to cover other products, including hydrochlorofluorocarbons (HCFCs).

The refrigeration and air conditioning industry has made a considerable investment in substitution of these refrigerants, and accordingly hydrofluorocarbons (HFCs) were put on the market.

In the automobile industry, the systems for air conditioning of vehicles marketed in many countries have changed over from a chlorofluorocarbon refrigerant (CFC-12) to a hydrofluorocarbon refrigerant (1,1,1,2-tetrafluoroethane: HFC-134a), which is less harmful to the ozone layer. However, with respect to the objectives established by the Kyoto protocol, HFC-134a (GWP=1300) is considered to have a high warming power. A fluid's contribution to the greenhouse effect is quantified by a criterion, GWP (Global Warming Potential), which summarizes the warming power by taking a reference value of 1 for carbon dioxide.

As carbon dioxide is nontoxic, nonflammable and has a very low GWP, it has been proposed as a refrigerant for air conditioning systems in place of HFC-134a. However, the use of carbon dioxide has several drawbacks, notably connected with the very high pressure for its application as refrigerant in existing equipment and technologies.

Moreover, the mixture R-404A consisting of 44 wt. % of pentafluoroethane, 52 wt. % of trifluoroethane and 4 wt. % of HFC-134a is widely used as refrigerant for large areas (supermarkets) and in refrigerated transport. However, this mixture has a GWP of 3900.

Document JP 4110388 describes the use of hydrofluoropropenes of formula $C_3H_mF_n$, with m, n representing an integer between 1 and 5 inclusive and m+n=6, as heat transfer fluids, in particular tetrafluoropropene and trifluoropropene.

Document WO2004/037913 discloses the use of compositions comprising at least one fluoroalkene having three or four carbon atoms, notably pentafluoropropene and tetrafluoropropene, preferably having a GWP of at most 150, as heat transfer fluids.

Document WO 2006/094303 discloses an azeotropic composition containing 7.4 wt. % of 2,3,3,3-tetrafluoropropene (HFO-1234yf) and 92.6 wt. % of difluoromethane (HFC-32). This document also discloses quasi-azeotropic compositions containing from 1 to 57 wt. % of 2,3,3,3-tetrafluoropropene and from 43 to 99 wt. % of difluoromethane.

A heat exchanger is a device for transferring thermal energy from one fluid to another, without mixing them. The thermal flux passes through the exchange surface that separates the fluids. Mostly this method is used for cooling or heating a liquid or a gas that cannot be cooled or heated directly.

In compression systems, heat exchange between the refrigerant and the heat sources takes place via heat-transfer fluids. These heat-transfer fluids are in the gaseous state (the air in air conditioning and direct-expansion refrigeration), liquid (water in domestic heat pumps, glycol solution) or two-phase.

There are various transfer modes:
- the two fluids are arranged in parallel and go in the same sense: co-current mode (antimethodical);
- the two fluids are arranged in parallel but go in the opposite sense: countercurrent mode (methodical);
- the two fluids are positioned perpendicularly: crossed-current mode. The crossed current can have co-current or countercurrent tendency;
- one of the two fluids makes a U-turn in a wider pipeline, which the second fluid passes through. This configuration is comparable to a co-current exchanger on half its length, and to a countercurrent exchanger for the other half: pin-head mode.

The applicant has now discovered that binary compositions of 2,3,3,3-tetrafluoropropene and difluoromethane are particularly advantageous as heat transfer fluid in compression-type refrigeration systems with exchangers operating in countercurrent mode or in crossed-current mode with countercurrent tendency.

Thus, these compositions can be used as heat transfer fluid in heat pumps, optionally reversible, up to a heating temperature of 95° C., in air conditioning, industrial air conditioning (paper, rooms for servers), in mobile domestic air conditioning, in domestic refrigeration and freezing, employing compression systems with exchangers in countercurrent mode or in crossed-current mode with countercurrent tendency.

SUMMARY

The use of a binary composition of 2,3,3,3-tetrafluoropropene and difluoromethane as heat transfer fluid in compression-type refrigeration systems with exchangers in countercurrent mode or in crossed-current mode with countercurrent tendency.

The use characterized in that the composition contains essentially from 70 to 90 wt. % of 2,3,3,3-tetrafluoropropene and from 10 to 30 wt. % of difluoromethane.

The characterized in that the composition contains essentially from 78 to 84 wt. % of 2,3,3,3-tetrafluoropropene and from 16 to 22 wt. % of difluoromethane.

The use characterized in that the composition contains essentially from 81 to 83 wt. % of 2,3,3,3-tetrafluoropropene and from 17 to 19 wt. % of difluoromethane.

The use characterized in that the binary composition is employed as heat transfer fluid for air conditioning and heat pumps.

A method of heat transfer in which a binary composition of 2,3,3,3-tetrafluoropropene and difluoromethane is used as refrigerant in compression systems with exchangers in countercurrent mode or in crossed-current mode with countercurrent tendency.

The method characterized in that the composition contains essentially from 70 to 90 wt. % of 2,3,3,3-tetrafluoropropene and from 10 to 30 wt. % of difluoromethane.

The method characterized in that the composition contains essentially from 78 to 84 wt. % of 2,3,3,3-tetrafluoropropene and from 16 to 22 wt. % of difluoromethane.

The method characterized in that the binary composition is stabilized.

The method characterized in that it is implemented in the presence of a lubricant.

A composition, characterized in that it contains essentially from 78 to 84 wt. % of 2,3,3,3-tetrafluoropropene and from 16 to 20 wt. % of difluoromethane.

The composition characterized in that it contains essentially from 81 to 83 wt. % of 2,3,3,3-tetrafluoropropene and from 17 to 19 wt. % of difluoromethane.

The composition characterized in that it comprises a stabilizer.

The composition characterized in that it comprises a lubricant.

DETAILED DESCRIPTION

A first object of the present invention relates to the use of binary compositions of 2,3,3,3-tetrafluoropropene and difluoromethane as heat transfer fluid in compression-type refrigeration systems with exchangers in countercurrent mode or in crossed-current mode with countercurrent tendency.

Preferably, binary compositions of 2,3,3,3-tetrafluoropropene and difluoromethane are used as heat transfer fluid for air conditioning and heat pumps, with exchangers in countercurrent mode or in crossed-current mode with countercurrent tendency.

The binary compositions of 2,3,3,3-tetrafluoropropene and difluoromethane are preferably zeotropic and contain essentially from 70 to 90 wt. % of 2,3,3,3-tetrafluoropropene and from 10 to 30 wt. % of difluoromethane.

Preferably, the zeotropic compositions contain essentially from 78 to 84 wt. % of 2,3,3,3-tetrafluoropropene and from 16 to 22 wt. % of difluoromethane.

The advantageously preferred zeotropic compositions contain essentially from 81 to 83 wt. % of 2,3,3,3-tetrafluoropropene and from 17 to 19 wt. % of difluoromethane.

The binary compositions used in the present invention have both a zero ODP and a low GWP. Their high critical temperature (>90° C.) means that they can be used in extreme conditions, namely very high ambient temperatures or for producing heat at high temperature (in heat pumps). The coefficient of performance (COP: the ratio of the thermal power to the electricity consumption of a heat pump or of an air conditioner) of these binary compositions, in exchangers in countercurrent mode, is higher than that of existing refrigerant compositions. Taking into account the pressure level at the condenser and the compression ratios, it is not necessary to develop new compressors; the compressors currently on the market may be suitable.

The binary compositions used in the present invention can replace R-404A and R-407C (ternary mixture containing 52 wt. % of HFC-134a, 25 wt. % of pentafluoroethane and 23 wt. % of difluoromethane) in compression-type heat-transfer systems with exchangers operating in countercurrent mode or in crossed-current mode with countercurrent tendency.

Moreover, binary zeotropic compositions can be used in compression systems equipped with a device for varying the composition by controlled distillation. Such a device makes it possible to improve efficiency and reduce losses during compressor starting and stopping.

The binary compositions used according to the present invention can be stabilized. The amount of stabilizer preferably represents at most 5 wt. % relative to the binary composition.

As stabilizers, we may notably mention nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl optionally fluorinated or perfluorinated or alkenyl or aromatic) such as n-butyl glycidyl ether, hexanediol diglycidyl ether, allyl glycidyl ether, butylphenylglycidyl ether, phosphites, phosphates, phosphonates, thiols and lactones.

A second object of the present invention relates to a method of heat transfer in which binary compositions of 2,3,3,3-tetrafluoropropene and difluoromethane, as defined above, are used as refrigerant in compression systems using exchangers in countercurrent mode or in crossed-current mode with countercurrent tendency. The method according to the present invention can be employed in the presence of lubricants such as mineral oil, alkylbenzene, polyalkylene glycol, polyol ester and polyvinyl ether.

A third object of the present invention relates to a binary composition containing essentially 78 to 84 wt. % of 2,3,3,3-tetrafluoropropene and from 16 to 22 wt. % of difluoromethane.

The binary composition preferred according to the third object contains essentially from 81 to 83 wt. % of 2,3,3,3-tetrafluoropropene and from 17 to 19 wt. % of difluoromethane.

The binary compositions, according to the third object of the present invention, can be stabilized. The amount of stabilizer preferably represents at most 5 wt. % relative to the binary composition.

The stabilizer can be selected from those mentioned above.

The composition according to the third object can be used as heat transfer fluid.

A fourth object according to the present invention relates to a composition comprising the binary composition according to the third object, optionally stabilized, and at least one lubricant. The lubricant can be selected from mineral oil, alkylbenzene, polyalkylene glycol, polyol ester and polyvinyl ether.

EXPERIMENTAL SECTION

Tools for Calculation

The RK-Soave equation is used for calculating the densities, enthalpies, entropies and the data on liquid-vapor equilibrium of the mixtures. To use this equation it is necessary to know the properties of the pure substances used in the mixtures in question as well as the coefficients of interaction for each binary mixture.

The data required for each pure substance are:

Boiling point, critical temperature and pressure, curve of pressure as a function of temperature from the boiling point to the critical point, the saturated liquid density and saturated vapor density as a function of temperature.

HFC-32:

The data for HFC-32 are published in ASHRAE Handbook 2005 chapter 20 and are also available using Refrop (software developed by NIST for calculating the properties of refrigerants)

HFO-1234yf:

The data of the temperature-pressure curve of HFO-1234yf are measured by the static method. The critical temperature and pressure are measured with a C80 calorimeter marketed by Setaram. The densities, at saturation as a function of temperature, are measured by the vibrating tube densimeter technology developed by the laboratories of the Ecole de Mines ("Mining Engineering College") in Paris.

Coefficient of Binary Interaction of HFC-32/HFO-1234yf:

The RK-Soave equation uses coefficients of binary interaction for representing the behavior of the products in mixtures. The coefficients are calculated as a function of experimental data for liquid-vapor equilibrium.

The technique used for the measurements of liquid-vapor equilibrium is the static analytical cell method. The equilibrium cell comprises a sapphire tube and is equipped with two ROLSI™ electromagnetic samplers. It is immersed in a cryothermostat bath (HUBER HS40). Magnetic stirring driven by a field rotating at variable speed is used for accelerating attainment of the equilibria. The samples are analyzed by gas chromatography (HP5890 series II) using a catharometer (TCD).

The measurements of liquid-vapor equilibrium on the HFC-32/HFO-1234yf binary mixture are performed for the following isotherms: −10° C., 30° C. and 70° C.

Compression System

Consider a compression system equipped with an evaporator and countercurrent condenser, a screw compressor and a pressure reducing valve.

The system operates with 15° C. of superheating and 5° C. of supercooling. The minimum temperature difference between the secondary fluid and the refrigerant is considered to be of the order of 5° C.

The isentropic efficiency of the compressors is a function of the compression ratio. This efficiency is calculated from the following equation:

$$\eta_{isen} = a - b(\tau - c)^2 - \frac{d}{\tau - e} \quad (1)$$

For a screw compressor, the constants a, b, c, d and e in equation (1) of isentropic efficiency are calculated on the basis of the standard data published in the Handbook "Handbook of air conditioning and refrigeration", page 11.52.

The coefficient of performance (COP) is defined as the ratio of the useful power delivered by the system to the power supplied to or consumed by the system.

The Lorenz coefficient of performance (COPLorenz) is a reference coefficient of performance. It is a function of temperature and is used for comparing the COPs of different fluids.

The Lorenz coefficient of performance is defined as follows:

(The Temperatures T are in K)

$$T_{mean}^{condenser} = T_{inlet}^{condenser} - T_{outlet}^{condenser} \quad (2)$$

$$T_{mean}^{evaporator} = T_{outlet}^{evaporator} - T_{inlet}^{evaporator} \quad (3)$$

The Lorenz COP in the case of air conditioning and refrigeration is:

$$COPlorenz = \frac{T_{mean}^{evaporator}}{T_{mean}^{condenser} - T_{mean}^{evaporator}} \quad (4)$$

The Lorenz COP in the case of heating is:

$$COPlorenz = \frac{T_{mean}^{condenser}}{T_{mean}^{condenser} - T_{mean}^{evaporator}} \quad (5)$$

For each composition, the coefficient of performance of the Lorenz cycle is calculated as a function of the corresponding temperatures.

% COP/COPLorenz is the ratio of the COP of the system relative to the COP of the corresponding Lorenz cycle.

Results, Heating Mode

In heating mode, the compression system operates between a refrigerant inlet temperature at the evaporator of −5° C. and a refrigerant inlet temperature at the condenser of 50° C. The system delivers heat at 45° C.

The performance of the compositions according to the invention in heat pump operating conditions are given in Table 1. The values of the constituents (HFO-1234yf, HFC-32) for each composition are given as percentage by weight.

TABLE 1

| HFO-1234yf | HFC-32 | Temp outlet evap (° C.) | Temp outlet comp (° C.) | T outlet cond (° C.) | evap P (bar) | cond P (bar) | Ratio (w/w) | Shift | efficiency comp | % COP/COPLorenz |
|---|---|---|---|---|---|---|---|---|---|---|
| R404A | | −5 | 77 | 50 | 5.2 | 23.0 | 4.4 | 0.38 | 79.7 | 57.7 |
| 85 | 15 | 0 | 76 | 43 | 4.0 | 16.5 | 4.1 | 4.84 | 80.6 | 64.7 |
| 84 | 16 | 0 | 77 | 43 | 4.1 | 16.7 | 4.1 | 5.01 | 80.7 | 64.7 |
| 83 | 17 | 0 | 77 | 43 | 4.2 | 17.0 | 4.1 | 5.16 | 80.7 | 64.7 |
| 82 | 18 | 0 | 78 | 43 | 4.2 | 17.2 | 4.1 | 5.29 | 80.8 | 64.7 |
| 81 | 19 | 0 | 78 | 43 | 4.3 | 17.5 | 4.1 | 5.39 | 80.8 | 64.7 |

TABLE 1-continued

|  | Temp outlet evap (° C.) | Temp outlet comp (° C.) | T outlet cond (° C.) | evap P (bar) | cond P (bar) | Ratio (w/w) | Shift | efficiency comp | % COP/ COPLorenz |
|---|---|---|---|---|---|---|---|---|---|
| 80 | 20 | 0 | 79 | 43 | 4.4 | 17.7 | 4.0 | 5.48 | 80.8 | 64.7 |
| 79 | 21 | 1 | 80 | 43 | 4.5 | 18.0 | 4.0 | 5.54 | 80.9 | 64.7 |
| 78 | 22 | 1 | 80 | 43 | 4.5 | 18.2 | 4.0 | 5.59 | 80.9 | 64.7 |

Results, Cooling Mode

In cooling mode, the compression system operates between a refrigerant inlet temperature at the evaporator of −5° C. and a refrigerant inlet temperature at the condenser of 50° C. The system delivers cold at 0° C.

The performance of the compositions according to the invention in the operating conditions of cooling are given in Table 2. The values of the constituents (HFO-1234yf, HFC-32) for each composition are given as percentage by weight.

TABLE 2

|  |  | Temp outlet evap (° C.) | Temp outlet comp (° C.) | T outlet cond (° C.) | evap P (bar) | cond P (bar) | Ratio (w/w) | Shift | efficiency comp | % COP/ COPLorenz |
|---|---|---|---|---|---|---|---|---|---|---|
| R404A |  | −5 | 77 | 50 | 5.2 | 23.0 | 4.4 | 0.38 | 79.7 | 47.9 |
| HFO-1234yf | HFC-32 |  |  |  |  |  |  |  |  |  |
| 88 | 12 | −1 | 75 | 44 | 3.7 | 15.7 | 4.2 | 4.20 | 80.3 | 55.9 |
| 87 | 13 | −1 | 75 | 43 | 3.8 | 16.0 | 4.2 | 4.44 | 80.4 | 56.0 |
| 86 | 14 | 0 | 76 | 43 | 3.9 | 16.2 | 4.2 | 4.65 | 80.5 | 56.2 |
| 85 | 15 | 0 | 76 | 43 | 4.0 | 16.5 | 4.1 | 4.84 | 80.6 | 56.3 |
| 84 | 16 | 0 | 77 | 43 | 4.1 | 16.7 | 4.1 | 5.01 | 80.7 | 56.4 |
| 83 | 17 | 0 | 77 | 43 | 4.2 | 17.0 | 4.1 | 5.16 | 80.7 | 56.4 |
| 82 | 18 | 0 | 78 | 43 | 4.2 | 17.2 | 4.1 | 5.29 | 80.8 | 56.5 |
| 81 | 19 | 0 | 78 | 43 | 4.3 | 17.5 | 4.1 | 5.39 | 80.8 | 56.5 |
| 80 | 20 | 0 | 79 | 43 | 4.4 | 17.7 | 4.0 | 5.48 | 80.8 | 56.5 |
| 79 | 21 | 1 | 80 | 43 | 4.5 | 18.0 | 4.0 | 5.54 | 80.9 | 56.6 |
| 78 | 22 | 1 | 80 | 43 | 4.5 | 18.2 | 4.0 | 5.59 | 80.9 | 56.6 |

The invention claimed is:

1. A method of replacing a first heat transfer fluid comprising R-404A with a second heat transfer fluid comprising a refrigerant consisting essentially of from 70 to 90 wt. % 2,3,3,3-tetrafluoropropene and from 10 to 30 wt. % of difluoromethane, wherein said replacing is in a compression-type refrigeration system with an exchanger operating in countercurrent mode or in crossed-current mode with countercurrent tendency.

2. The method as claimed in claim 1, wherein the refrigerant consists essentially of from 81 to 83 wt. % of 2,3,3,3-tetrafluoropropene and from 17 to 19 wt. % of difluoromethane.

3. The method as claimed in claim 1, wherein the refrigerant consists essentially of from 78 to 84 wt. % of 2,3,3,3-tetrafluoropropene and from 16 to 22 wt. % of difluoromethane.

4. The method as claimed in claim 1, wherein the refrigerant consists of from 70 to 90 wt. % of 2,3,3,3-tetrafluoropropene and from 10 to 30 wt. % of difluoromethane.

5. The method as claimed in claim 1, wherein the refrigerant consists of from 81 to 83 wt. % of 2,3,3,3-tetrafluoropropene and from 17 to 19 wt. % of difluoromethane.

6. The method as claimed in claim 1, wherein the refrigerant consists of from 78 to 84 wt. % of 2,3,3,3-tetrafluoropropene and from 16 to 22 wt. % of difluoromethane.

7. The method as claimed in claim 1, wherein the second heat transfer fluid further comprises a stabilizer.

8. The method as claimed in claim 1, wherein the second heat transfer fluid further comprises a lubricant.

9. The method as claimed in claim 8, wherein the lubricant is mineral oil.

10. The method as claimed in claim 8, wherein the lubricant is alkylbenzene.

11. The method as claimed in claim 8, wherein the lubricant is polyalkylene glycol.

12. The method as claimed in claim 8, wherein the lubricant is polyol ester.

13. The method as claimed in claim 8, wherein the lubricant is polyvinyl ether.

14. The method as claimed in claim 1, wherein said replacing is in a compression-type refrigeration system with an exchanger operating in countercurrent mode.

15. The method as claimed in claim 1, wherein said replacing is in compression-type refrigeration systems with an exchanger operating in crossed-current mode with countercurrent tendency.

* * * * *